United States Patent
Mancini (10) Patent No.: US 12,292,292 B2
(45) Date of Patent: May 6, 2025

(54) SYSTEM AND METHOD OF OBSERVING AND MEASURING DISMOUNT LAND NAVIGATION

(71) Applicant: Adam Mancini, Bedford, MA (US)

(72) Inventor: Adam Mancini, Bedford, MA (US)

( * ) Notice: Subject to any disclaimer, the term of this patent is extended or adjusted under 35 U.S.C. 154(b) by 508 days.

(21) Appl. No.: 17/882,580

(22) Filed: Aug. 7, 2022

(65) Prior Publication Data

US 2024/0044653 A1 Feb. 8, 2024

(51) Int. Cl.
| | |
|---|---|
| G08G 1/095 | (2006.01) |
| G01C 21/00 | (2006.01) |
| G01C 21/30 | (2006.01) |
| G01C 21/36 | (2006.01) |
| G01S 19/24 | (2010.01) |
| G06T 11/60 | (2006.01) |
| G09B 29/00 | (2006.01) |

(52) U.S. Cl.
CPC ......... *G01C 21/30* (2013.01); *G01C 21/3667* (2013.01); *G01C 21/3807* (2020.08); *G01S 19/24* (2013.01); *G06T 11/60* (2013.01); *G09B 29/003* (2013.01)

(58) Field of Classification Search
CPC .......... G01C 21/30; G01C 21/3667; G01C 21/3807; G01C 21/20; G01C 21/3833; G01C 21/165; G01S 19/24; G01S 19/18; G06T 11/60; G09B 29/003; G06F 3/14; H04L 67/12; H04L 67/125; H04L 67/52; H04W 4/80; H04W 4/021; H04W 4/38

USPC ............ 340/944, 573.1, 573.4, 686.1, 686.6
See application file for complete search history.

(56) References Cited

U.S. PATENT DOCUMENTS

| | | | |
|---|---|---|---|
| 8,718,927 B2* | 5/2014 | Kitchel | G01C 21/3819 701/413 |
| 11,054,267 B2* | 7/2021 | Katami | G01C 21/3626 |
| 2020/0072626 A1* | 3/2020 | Kumar | B60L 53/32 |
| 2021/0131807 A1* | 5/2021 | Chantz | G01C 21/20 |

* cited by examiner

*Primary Examiner* — Anh V La
(74) *Attorney, Agent, or Firm* — Dhiraj Jindal; Patent Yogi LLC (57) ABSTRACT

A system for improving accuracy in land navigation with limited non-electronic manual tools is provided. The system comprises a computer and application that provides a starting point and a first plurality of destination points in a field environment with instructions to physically locate the first plurality in a first order. The application also receives a second plurality of points indicating locations identified as corresponding to the first plurality, the second plurality physically found in the field in the first order. The application also plots on an electronic map the starting point, the first plurality, and the second plurality. The application also analyzes, based on observation of the plotted starting point and pluralities, of variances from each of the first plurality of points to a corresponding each of the second plurality of points. The application also displays analysis output and the map in a manner promoting group instruction about the variances.

20 Claims, 10 Drawing Sheets

SYSTEM AND METHOD OF OBSERVING AND MEASURING DISMOUNT LAND NAVIGATION

CROSS REFERENCE WITH RELATED APPLICATIONS

None

FIELD OF THE DISCLOSURE

The present disclosure is in the field of land navigation on foot by infantry and others. More particularly, the present disclosure provides systems and methods of measuring foot soldier progress in locating points on rough terrain using solely compass, map, and protractor while carrying a global positioning system (GPS) tracker, the tracker allowing soldier progress to be observed, plotted on a map, and analyzed for after action review immediately following completion of assigned course.

BACKGROUND

Global positioning system (GPS) is a critical technology that enables the functioning of global society. GPS is particularly important for the US military, where it can provide significant advantages. However, America's adversaries have invested heavily in capabilities to deny the US military its GPS access. In future conflicts with a near-peer adversaries, the US military can therefore expect to operate in environments in which GPS is not available. This has potentially severe repercussions for the operations of all US services. It will affect infantry abilities for land navigation, a fundamental military skill for any soldier.

Historically, military land navigation has been performed manually with maps and compasses. However, today's recruits rely heavily on digital and GPS-enabled information. An increasing number of recruits now fail even basic land navigation tests performed with manual tools. Failure rates for recruits have increased by 200% in the last decade, and this is now a primary reason why recruits fail most military schools. These failure rates also create significant unnecessary costs for the US Army and other services. Improving recruit success rates for land navigation courses may have significant positive impacts for the military financially and operationally.

DETAILED DESCRIPTION

Systems and methods described herein provide for monitoring an infantryman's or other soldier's progress on a field course to locate certain points using only a compass, a protractor, and a map. As discussed above, younger Americans have become excessively dependent on electronic devices in many areas of their lives. Servicepersons in the US military, especially younger persons, evidence this phenomenon by exhibiting weak skills in land navigation over rough terrain without the support of electronic devices.

Systems and methods provide for soldiers to use only compass, protractor, and map to locate points on a course in field terrain. The points are described using eight-digit Military Grid Reference System (MGRS) coordinates. Soldiers locate the points in a prescribed order. Solders wear GPS trackers allowing their movements to be monitored. A GPS transponder and base station receives movement data from the GPS trackers.

An application provided herein uses the GPS data to plot the soldiers' movements on a map. This may be done on a near real-time basis so that soldiers' movements and progress may be actively monitored by commanders.

The map also displays soldiers' starting points, the specified locations of points the soldiers are instructed to find, and the locations of points that the soldiers' eventually do find that may or may not match the specified points. The map may also display metrics such as the total time on the course for a given soldier, how a given soldier is performing compared to other soldiers, and environment information such as weather.

A soldier's ambulatory path as tracked and illustrated as described above may inform decisions by commanders about the soldier's progress in terms of ability to absorb material, physical and mental conditioning, and field judgement. When presented in an instructional setting and in a supportive manner, the map as well as other metrics may promote the soldier to improve land navigation skills and general field competency.

During or after a land navigation test of an infantryman (or woman), a commander, an instructor, or land navigation specialist may view a soldier's or multiple soldier's progress on a course. At a client device that accesses the application, the commander may view the map, use playback mode, zoom in on aspects of the terrain in the course and a soldier's movements, consult the displayed metrics, and make notes and calculations.

Viewing aspects of the subject terrain such as bodies of water, wetlands, and hills and environmental conditions such as weather and time of day, the commander may customize future training for individual or groups of soldiers. A commander may observe material differences in performance, for example, when soldiers navigate through heavily forested, desert, arctic, and jungle terrain. Decisions regarding assignments and missions may be based in part on these observations.

Figure 1:
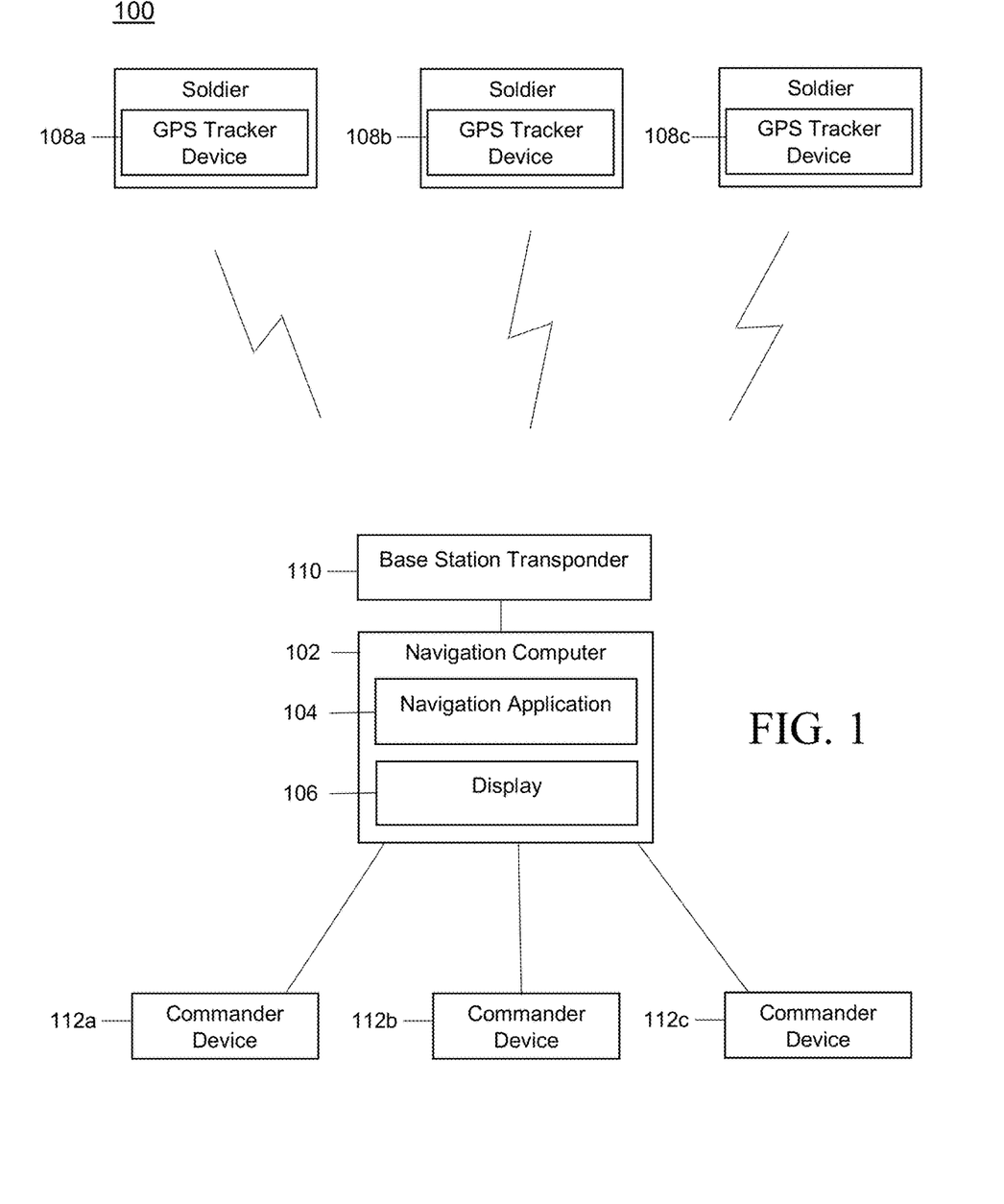
FIG. 1 is a block diagram of a system of observing and measuring dismount land navigation according to an embodiment of the present disclosure.
Figure 2:
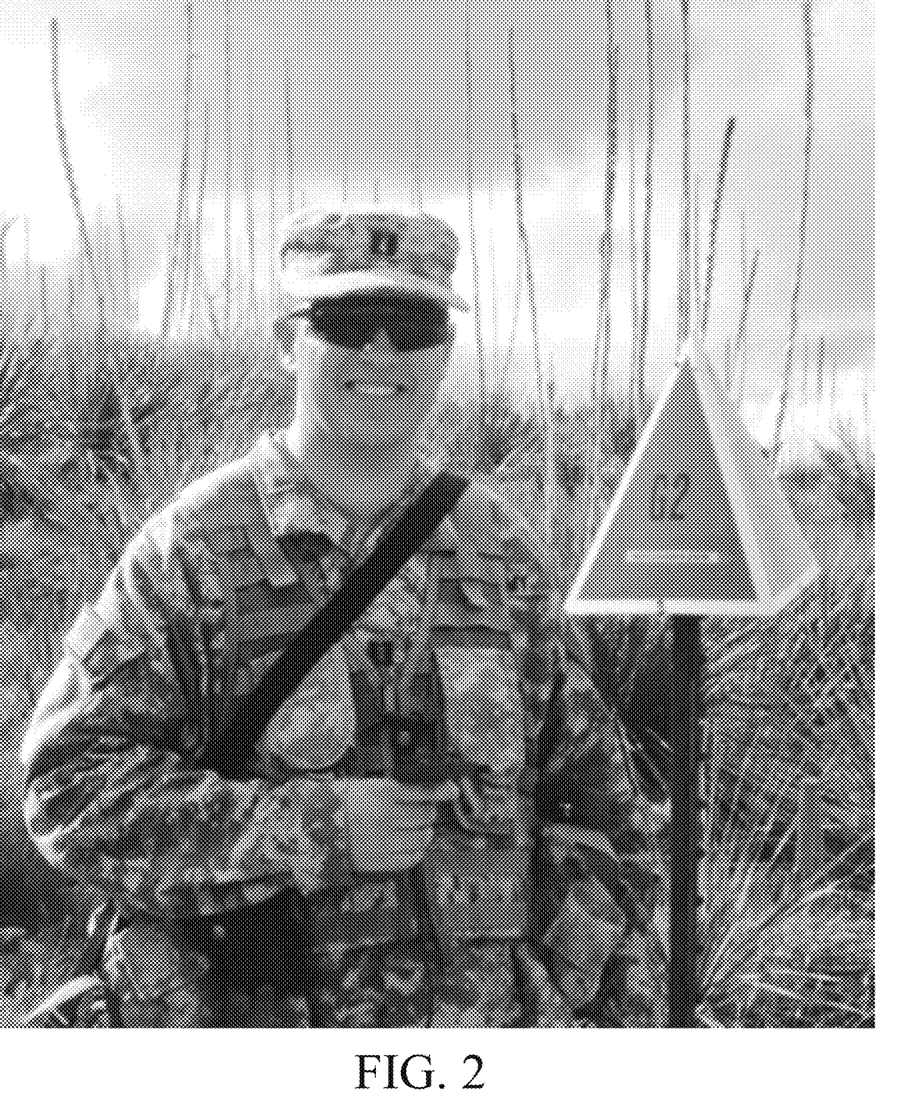
FIG. 2 through FIG. 10 are images of at least one component of a system of observing and measuring dismount land navigation according to embodiments of the present disclosure.
Figure 3:
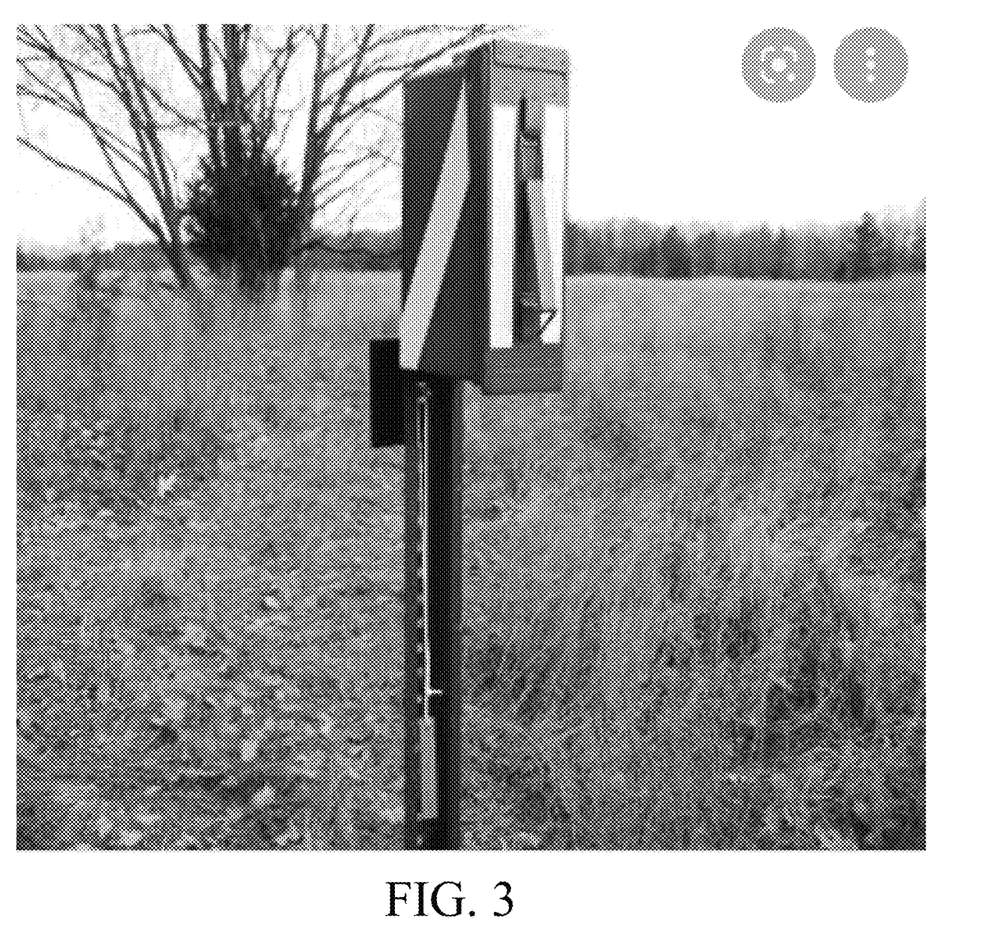
Figure 4:
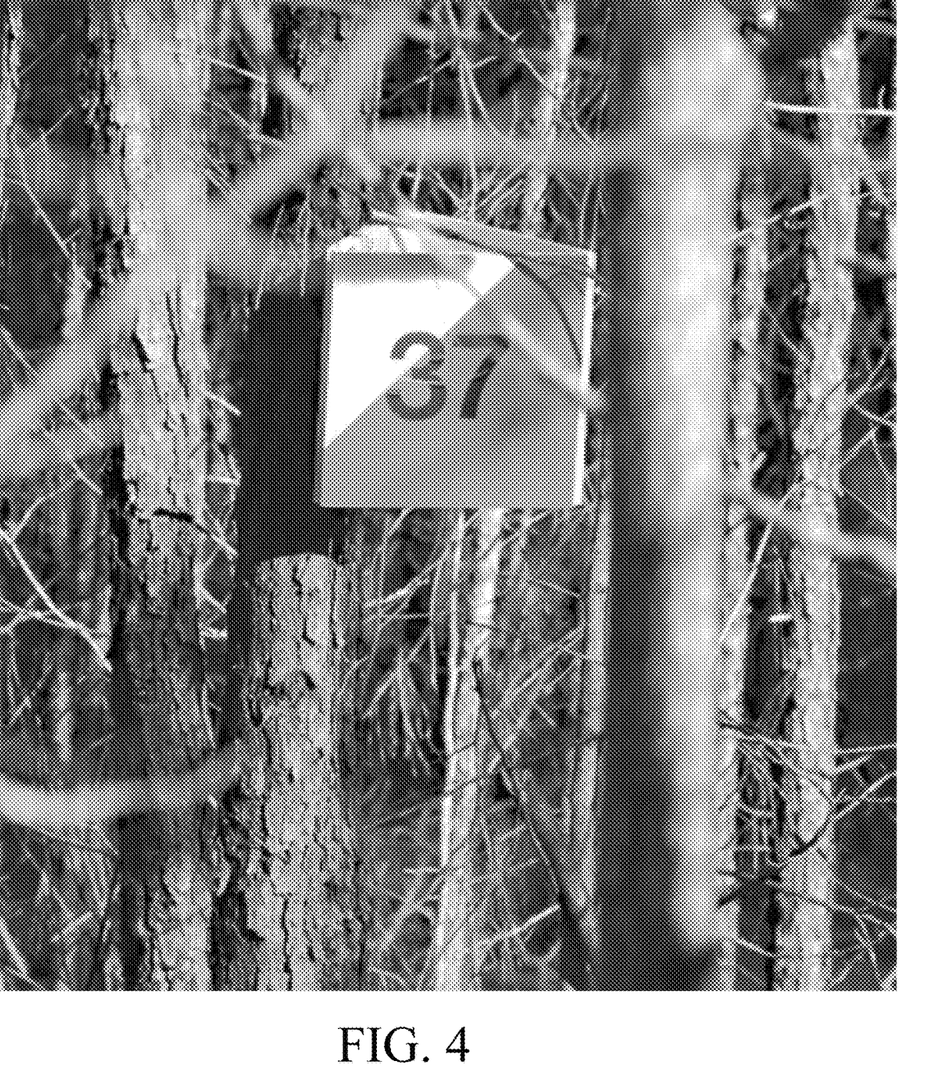
Figure 5:
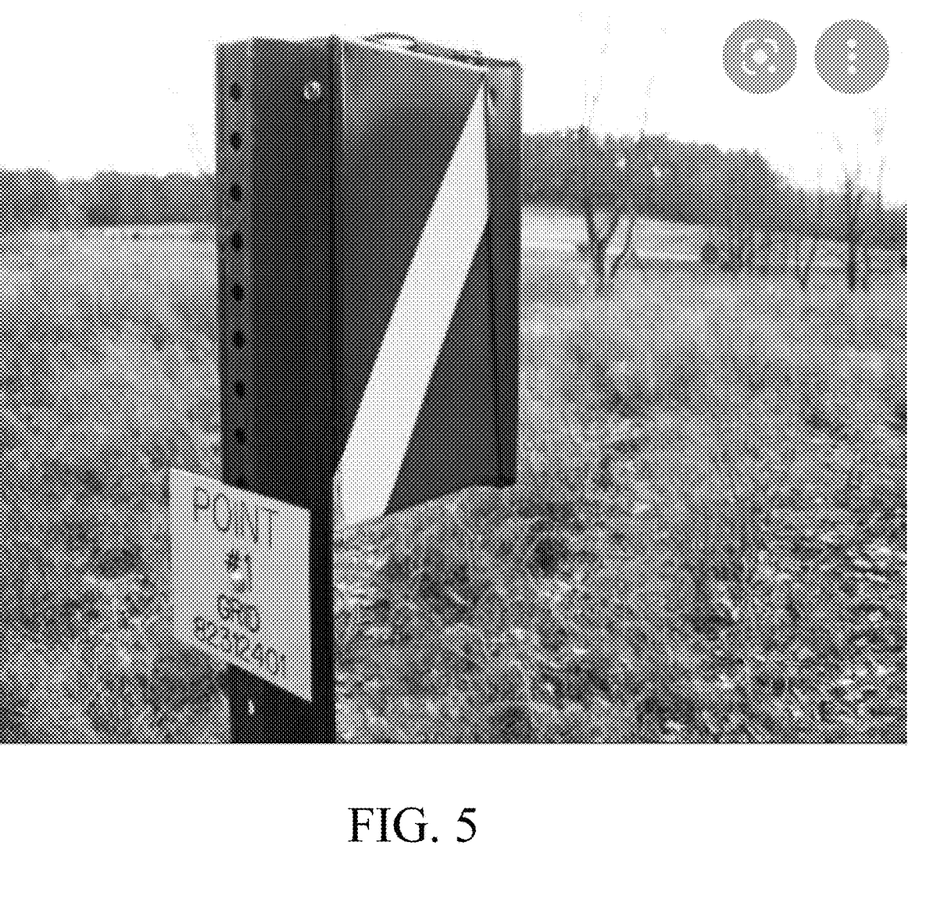

Turning to the figures, FIG. 1 illustrates basic components and interactions of a system for improving accuracy in land navigation with limited non-electronic manual tools. A system 100 is provided herein and illustrated in FIG. 1 comprising a navigation computer 102 and a navigation application 104, referred to henceforth for brevity as the computer 102 and the application 104, respectively. The system 100 also comprises a display 106, GPS trackers 108a-c, a base station transponder 110, and commander devices 112a-c.

The computer 102 hosts the application 104 as described above. The computer 102 may be more than one physical machine and may be situated at more than one geographical site. The application 104 executes at least on the computer 102. More than one instance of the application 104 may be executing at a given time. The application 104 may partially execute on devices other than the computer 102. The display 106 is at least one monitor attached to the computer 102 which displays maps and other media as described above.

The GPS trackers 108a-c are carried by soldiers in the field and transmit data about soldier movement to the base station transponder 110 which in turn feeds the data to the computer 102. The commander devices 112a-c are computers or other electronic devices that may log into or otherwise access the computer 102 to receive access to the display 106. Commanders and others may use the commander devices 112a-c to view the map and access tools provided by the system 100.

Soldiers may begin by scanning a Common Access Card (CAC) ready for scanning. They scan their CAC and receive a GPS tracker 108a-c. GPS trackers 108a-c are paired to five unique points and temporarily paired to only that specific soldier for only that specific test. Once the CAC and GPS tracker 108a-c are scanned and pairing is complete, the event begins for that soldier. A soldier may have five hours to find five points using a compass, protractor, and map. The five unique 8-digit grid locations may be printed and available for referencing on each GPS tracker 108a-c.

The soldier will begin plotting their points on a map, estimate azimuth and distance, and set out to find their points. During the event, commanders will be able to see the current locations of all soldiers in the general/group mode. Leaders will also have the option to select individual soldiers and view the performances of each with current location, playback mode, and points found.

The soldier is given a known starting point (8-digit grid) and given five different 8-digit grids (unknown points). The soldier will put these unknown points on his/her map and then can calculate the distance and directing between two points using a compass. The soldier takes those two numbers (in his/her head), will point the compass in the correct direction, and count (in his/her head) the number of steps (for distance).

Each eight-digit grid may get a soldier within ten meters of any location (six-digit grids get within 100 meters and ten-digit grids are separated by one meter). The eight-digit grid may be preferable because a soldier should be able to see the desired marker if he/she is ten meters away.

If a soldier somehow stumbles across another marker and if the course is self-correcting, the marker will display the eight-digit grid of that unintended marker. The soldier can then take the eight-digit grid of the unintended marker, plot it on his/her map, and then determine distance and direction to the actual sought marker. These three data points may be referred to as "dead reckoning" and are needed to navigate. The application 104 may consider it as a found marker if the GPS tracker 108a-c is within twenty meters.

A code is on each marker along with the grid coordinates. The soldier writes the code down on his/her paper. This is used as proof that he/she found the point. Markers usually look like the ones in FIG. 2 through FIG. 5.

The application 104 may change the color of the marker on the map if the GPS tracker 108a-c the soldier is carrying moves within 20 meters. Each soldier has a paper scorecard that he/she fills out. As the soldier goes through the course, he/she pencils in the code for each marker.

Once complete, the soldier returns to the start point and submits his/her scorecard for verification whether he/she passed or failed the event. Personnel at the starting point may manually or electronically submit the information to the application 104. The information my include the addresses of the markers that the soldier did find, whether or not those addresses are correct.

Commanders will be able to view in near real-time all solders presently on the course or select the individual performance of any selected soldier. When selecting "ALL" participants, the application 104 displays the current location of all soldiers on the map. In "INDIVIDUAL" mode, commanders may view the historical performance of any individual soldier and view how that soldier is currently progressing.

The "ALL" function may include rank and name next to current location. The "INDIVIDUAL" function shows rank, name, and historical data. "INDIVIDUAL" soldiers can be selected in a menu bar on a side or other margin area of the display 106.

The application 104 may assist parties in accessing information on the azimuth (direction) and distance between any two points. By highlighting two points, the system shows both data outputs on the display 106. When highlighting two points, a line may appear between the two points and show direction on one side of the line and distance on the other side.

Pass or fail, each individual soldier may re-watch the event in playback mode. The playback mode is sped up so that the soldier can get the critique in less time. In an embodiment, for every rep return in real life for 15 seconds, the application 104 may replay the rep returns two per second.

An event that lasts four hours will have 960 rep returns of historical data. In this embodiment, the full playback mode will last eight minutes. The playback mode may also have features to rewind 15 seconds, fast forward 15 seconds, and pause the event. The application may also compile data in equations that measure total distance vs optimal distance, deviation comparisons from the optimal direction, and percentile comparisons.

A formula used for this calculation is: $D (X_m - X_t)/X_t * 100$

Where D is the percent deviation (%), $X_m$ is the measured value of the distance traveled during the event, and $X_t$ is the true value of the distance between points.

One way to analyze a soldier's performance is by examining the time it takes to complete the event. The soldier may be given five hours to complete the event, but many finish early. The overall time to completion may be an unfair statistic since the overall distance between each soldier's five points will vary. By using a soldier's overall distance travelled and dividing it by the overall time, one may see how fast this soldier travelled. Once this number is calculated, percentiles can be determined. Percentiles may be a preferable way to compare performance across a large group of soldiers.

The term percentile and the related term percentile rank are often used in the reporting of scores from norm-referenced tests. For example, if a score is at the 86th percentile, where 86 is the percentile rank, it is equal to the value below which 86% of the observations may be found. In contrast, if it is in the 86th percentile, the score is at or below the value of which 86% of the observations may be found.

This might be considered unfair to compare soldiers who perform this event more than others. A soldier just performing this event for the first time might feel discouraged if he/she places below 20th in percentile. But by comparing this soldier to others in his rank or Military Occupational Specialty (MOS), that 20th percentile might result in a higher number. This idea also works inversely as well. If soldier earns an average (50th percentile) score when compared to others in his/her MOS or rank, he/she might feel discouraged, but by comparing him/her to a much larger group of soldiers might result in a higher score.

Other than the overall time needed for a soldier to complete this test, another performance metric may be the distance traveled versus the shortest possible distance. By doing this, commanders may be able to see how well a soldier knows azimuth. This may be displayed by using a percentage deviation formula.

The total distance between points will always be equal or lower than the actual distance the soldier travels. Comparing the two numbers will show how much off track or drift a soldier has during the event. The larger the gap between actual distance between all five points and the distance traveled during the event will result in a higher percentage number. For this statistic, the lower the percentage number grades into a higher score.

Figure 6:
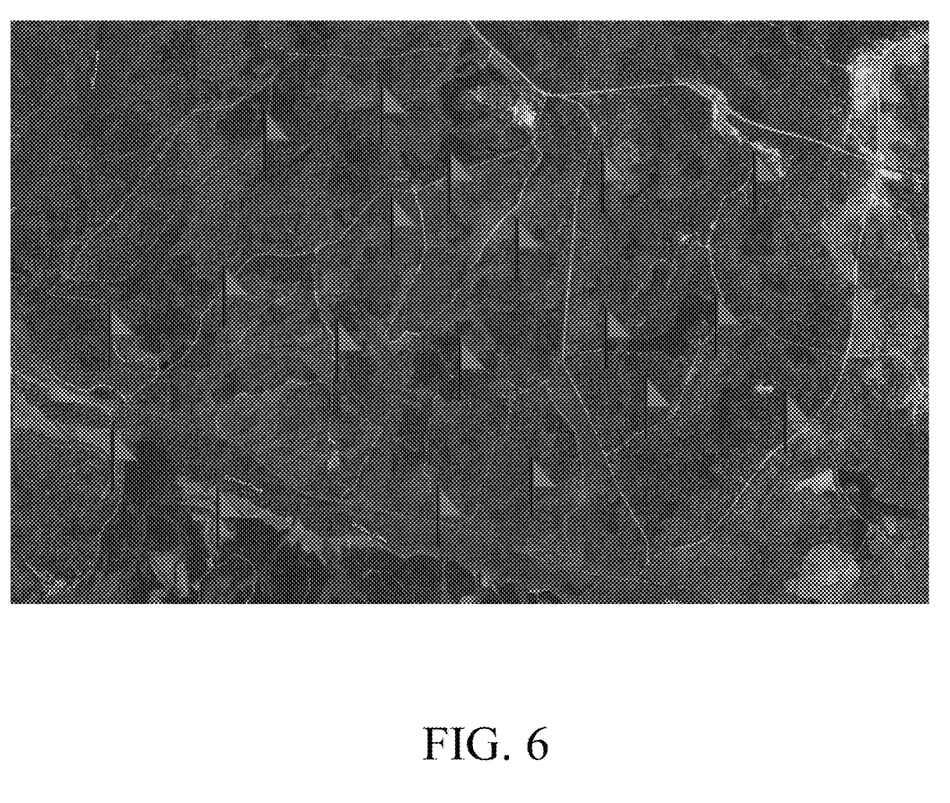

FIG. 6 through FIG. 10 depict maps for an example application of systems and methods provided herein. FIG. 6 is an initial map of a course before soldiers begin. In this example, there may be several hundred individual points in over several thousand acres of heavily wooded terrain. A particular solder may be required to locate five points in five hours. The small flags appearing in FIG. 6 represent some of the individual points that soldiers may be required to locate in a specific order.

Figure 7:
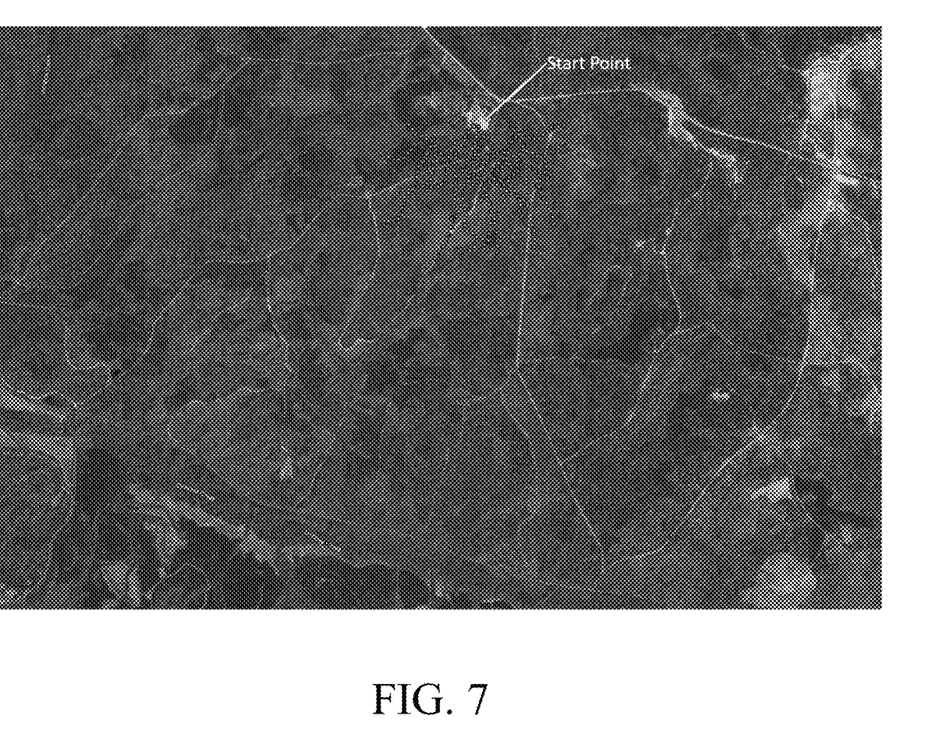

FIG. 7 depicts the event shortly after it begins. The path of each soldier is shown as a progression of dots on the map. Soldiers spread out from the starting point and try to find the points assigned to them.

Figure 8:
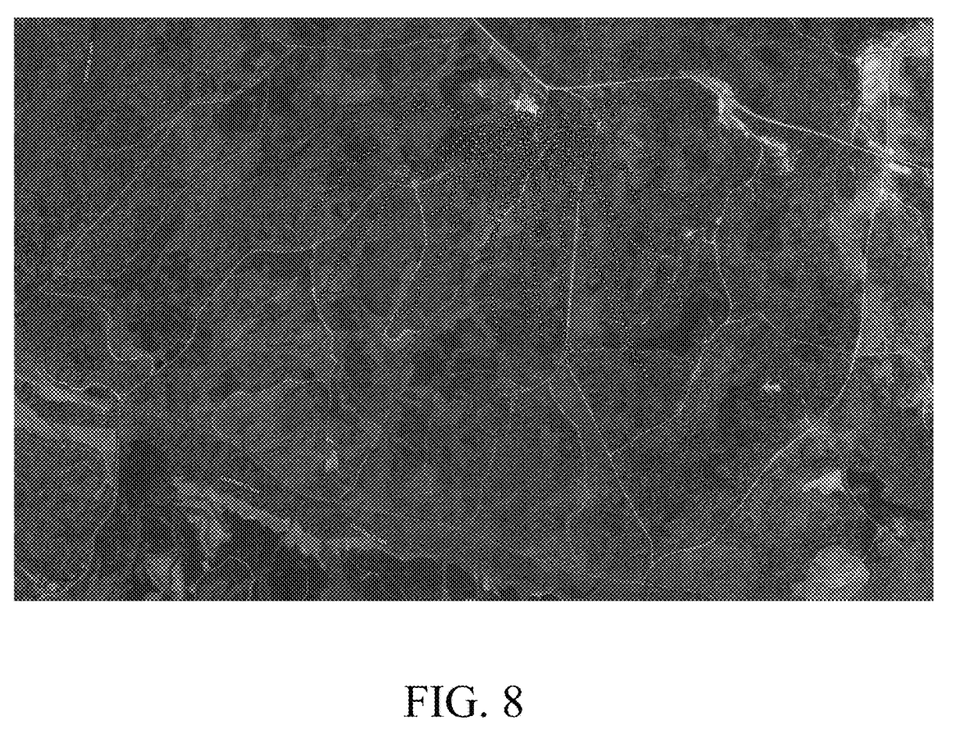

FIG. 8 illustrates that as the event unfolds, the cluster grows larger as soldiers continue to find their points. Each solder is given a different set of points to locate in a specific order.

Figure 9:
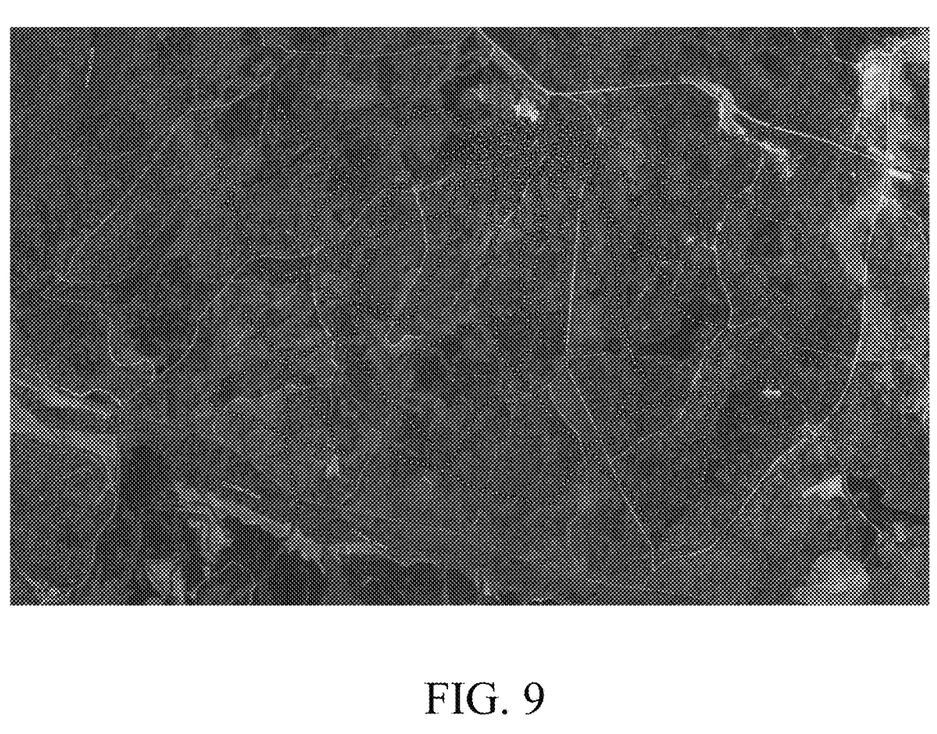

FIG. 9 illustrates solder progress near the conclusion of the approximately five-hour event. As each soldier has followed his own required course over the terrain, their paths are shown as crossing numerous times.

Figure 10:
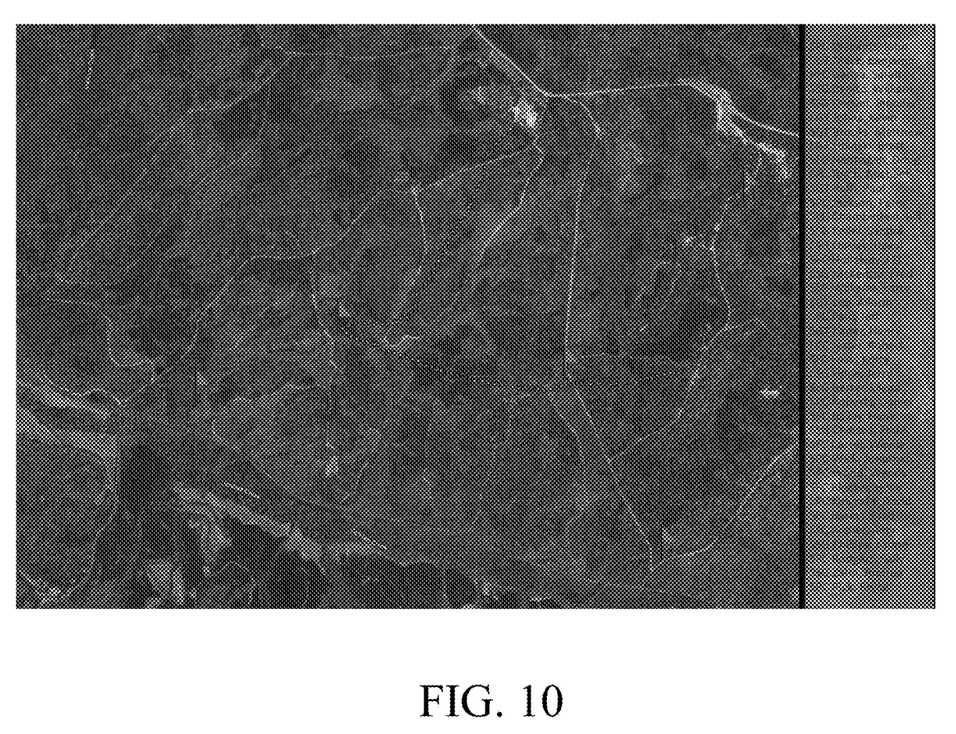

FIG. 10 illustrates the option described above in which a commander observing soldier progress on the map may restrict his/her view to a single solder. The commander takes this action by causing a panel to appear that displays a listing of the soldiers taking part in the event.

FIG. 10 shows the panel with the listing providing an option to select a soldier shown in the listing. Once the commander selects a particular soldier, the application 104 displays the route taken by the soldier as well as the points the solder has been tasked with locating.

While the present disclosure has been limited above to embodiments involving military applications, systems and methods may be useful in other applications. First responders and rescue professionals, forest fire fighters, outdoor scouts and outfitters, and recreation professionals and other enthusiasts may find use of systems and methods provided herein.

Systems and methods provided herein may be a good teaching and instructional tool for new recruits and young soldiers. When the map and other metrics and results generated by the application 104 are presented in a supportive, coaching manner younger soldiers may absorb the material well and view making improvements as a challenge instead of as a task. As many younger soldiers may have grown up in urban environments and may therefore have little experience with rugged terrain, a challenging but not overly difficult such as that described herein may introduce such young soldiers to enjoyable aspects of infantry life.

In an embodiment, system for improving accuracy in land navigation with limited non-electronic manual tools is provided. The system comprises a computer and an application stored in the computer. When executed on the computer, the application provides a starting point and a first plurality of destination points in a field environment with instructions to physically locate the first plurality in a first order. The application also receives a second plurality of points indicating locations identified as corresponding to the first plurality, the second plurality physically found in the field environment in the first order. The application also plots on an electronic map the starting point, the first plurality, and the second plurality. The application also performs analysis, based on observation of the plotted starting point and pluralities, of variances from each of the first plurality of points to a corresponding each of the second plurality of points. The application also displays analysis output and the map in a manner promoting group instruction about the variances.

The second plurality are found in the field environment with tools limited to a compass, a hard copy map of the environment, and a protractor. The first plurality are provided in eight digit format of the Military Grid Reference System (MGRS).

The system receives global positioning system (GPS) data describing movements of a participant in the field environment, the participant carrying a GPS tracker device. The system uses the GPS data to at least plot movements of participants on the electronic map.

Plotted and measured movements of participants support calculations about participant drift and pace count. Conduct of the group instruction is supported by the electronic map and illustrated variances and is further directed to improvement in reducing variances and time consumed in locating the destination points by participants.

The system simultaneously plots on the map ambulatory progress of a plurality of participants in the field environment and promotes isolation of progress of specific participants on the map to support the group instruction and remedial action. The analysis output further comprises at least the GPS data compiled in equations that measure total distance versus optimal distance, deviation comparisons from optimal directions, and percentile comparisons with groups of test participants.

In another embodiment, a system for observing, analyzing, and improving navigation skills by infantry is provided. The system comprises a computer and an application stored on the computer. When executed, the application plots output of a land navigation test on a map, the output comprising objective points to be located and actual points located by a test subject during the test in a field environment. The application also plots physical movements of the test subject on the map, the test subject engaging in the movements while locating the actual points. Based at least on the plotted output and the plotted physical movements, the application also determines metrics comprising distances between objective points and actual points, total distance walked by the test subject, time consumed for test, drift from ideal course between objective points, and number of paces. The application also displays at least one of the map, the plotted output, the plotted physical movements, and the determined metrics in media facilitating instruction and remedial action.

The physical movements are observable and trackable based on a stream of global positioning system (GPS) data, the GPS data produced at least by GPS tracking devices carried by the test subject. The physical movements are plotted on a near real-time basis.

The objective points are provided in eight-digit format of the Military Grid Reference System (MGRS). The test subject is provided with tools limited to a compass, a map, and a protractor in locating the objective points during the test.

In yet another embodiment, a method for managing a plurality of infantry personnel through land navigation training is provided. The method comprises a computer plotting on a map ambulatory paths of a plurality of land navigation test subjects, each subject pursuing a personalized course to locate a succession of designated points in a field environment. The method also comprises the computer highlighting on the map a first ambulatory path of a first test subject pursuing a first personalized course. The method also comprises the computer removing ambulatory paths for all subjects except the first test subject from the map. The method also comprises the computer determining metrics regarding the first test subject based at least on global positioning system (GPS) data compiled in equations that measure total distance versus optimal distance, deviation comparisons from optimal directions, and percentile comparisons with groups of test subjects.

The method also comprises the computer receiving the GPS data from GPS tracker devices attached to each test subject. The method also comprises the computer using the GPS data to plot the ambulatory paths on the map on a near real-time basis.

The method also comprises the test subject receiving tools limited to a compass, a map, and a protractor in locating the objective points during the test. The method also comprises the computer displaying the map and the determined metrics in a media presentation promoting instruction and remedial action. The method also comprises the computer providing the designated points in eight-digit format of the Military Grid Reference System (MGRS).

What is claimed is:

1. A system for improving accuracy in land navigation with limited non-electronic manual tools, comprising:
   a computer;
   an application that when executed on the computer:
      provides a starting point and a first plurality of destination points in a field environment with instructions to physically locate the first plurality in a first order,
      receives a second plurality of points indicating locations identified as corresponding to the first plurality, the second plurality physically found in the field environment in the first order,
      plots on an electronic map the starting point, the first plurality, and the second plurality,
      performs analysis, based on observation of the plotted starting point and pluralities, of variances from each of the first plurality of points to a corresponding each of the second plurality of points, and
      displays analysis output and the map in a manner promoting group instruction about the variances.

2. The system of claim 1, wherein the second plurality are found in the field environment with tools limited to a compass, a hard copy map of the environment, and a protractor.

3. The system of claim 1, wherein the first plurality are provided in eight digit format of the Military Grid Reference System (MGRS).

4. The system of claim 1, wherein the system receives global positioning system (GPS) data describing movements of a participant in the field environment, the participant carrying a GPS tracker device.

5. The system of claim 4, wherein the system uses the GPS data to at least plot movements of participants on the electronic map.

6. The system of claim 5, wherein plotted and measured movements of participants support calculations about participant drift and pace count.

7. The system of claim 1, wherein conduct of the group instruction is supported by the electronic map and illustrated variances and is further directed to improvement in reducing variances and time consumed in locating the destination points by participants.

8. The system of claim 1, wherein the system simultaneously plots on the map ambulatory progress of a plurality of participants in the field environment and promotes isolation of progress of specific participants on the map to support the group instruction and remedial action.

9. The system of claim 1, wherein the analysis output further comprises at least the GPS data compiled in equations that measure total distance versus optimal distance, deviation comparisons from optimal directions, and percentile comparisons with groups of test participants.

10. A system for observing, analyzing, and improving navigation skills by infantry, comprising:
   a computer; and
   an application executing on the computer that:
      plots output of a land navigation test on a map, the output comprising objective points to be located and actual points located by a test subject during the test in a field environment,
      plots physical movements of the test subject on the map, the test subject engaging in the movements while locating the actual points,
      based at least on the plotted output and the plotted physical movements, determines metrics comprising distances between objective points and actual points, total distance walked by the test subject, time consumed for test, drift from ideal course between objective points, and number of paces, and
      displays at least one of the map, the plotted output, the plotted physical movements, and the determined metrics in media facilitating instruction and remedial action.

11. The system of claim 10, wherein the physical movements are observable and trackable based on a stream of global positioning system (GPS) data, the GPS data produced at least by GPS tracking devices carried by the test subject.

12. The system of claim 10, wherein the physical movements are plotted on a near real-time basis.

13. The system of claim 10, wherein the objective points are provided in eight-digit format of the Military Grid Reference System (MGRS).

14. The system of claim 10, wherein the test subject is provided with tools limited to a compass, a map, and a protractor in locating the objective points during the test.

15. A method for managing a plurality of infantry personnel through land navigation training, comprising:
   a computer plotting on a map ambulatory paths of a plurality of land navigation test subjects, each subject pursuing a personalized course to locate a succession of designated points in a field environment;
   the computer highlighting on the map a first ambulatory path of a first test subject pursuing a first personalized course;
   the computer removing ambulatory paths for all subjects except the first test subject from the map;
   the computer determining metrics regarding the first test subject based at least on global positioning system (GPS) data compiled in equations that measure total distance versus optimal distance, deviation comparisons from optimal directions, and percentile comparisons with groups of test subjects.

16. The method of claim 15, further comprising the computer receiving the GPS data from GPS tracker devices attached to each test subject.

17. The method of claim 15, further comprising the computer using the GPS data to plot the ambulatory paths on the map on a near real-time basis.

18. The method of claim 15, further comprising the test subject receiving tools limited to a compass, a map, and a protractor in locating the objective points during the test.

19. The method of claim 15, further comprising the computer displaying the map and the determined metrics in a media presentation promoting instruction and remedial action.

20. The method of claim 15, further comprising the computer providing the designated points in eight-digit format of the Military Grid Reference System (MGRS).

\* \* \* \* \*